(12) United States Patent
Teschner

(10) Patent No.: US 6,908,147 B2
(45) Date of Patent: Jun. 21, 2005

(54) GLASS COVER WITH SHATTERPROOFING FILM

(75) Inventor: Helmut Teschner, Landsberg (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/367,962

(22) Filed: Feb. 19, 2003

(65) Prior Publication Data

US 2004/0160090 A1 Aug. 19, 2004

(30) Foreign Application Priority Data

Feb. 18, 2002 (DE) .......................................... 102 06 717

(51) Int. Cl.[7] .................................................. B60J 7/00
(52) U.S. Cl. .................. 296/211; 296/215; 296/216.09
(58) Field of Search .............................. 296/211, 215, 296/216.09

(56) References Cited

U.S. PATENT DOCUMENTS

| 4,219,230 | A | * | 8/1980 | Lapine ........................ 296/201 |
| 4,361,625 | A | * | 11/1982 | Beckmann et al. ......... 428/412 |
| 4,509,791 | A | * | 4/1985 | Bienert et al. ......... 296/216.09 |
| 5,324,568 | A | * | 6/1994 | Coninx et al. ........... 428/195.1 |
| 5,849,402 | A | * | 12/1998 | Kraemling et al. ......... 428/220 |
| 6,034,320 | A | * | 3/2000 | Malcherczyk et al. ...... 136/251 |

FOREIGN PATENT DOCUMENTS

| DE | 43 23 140 A1 | 12/1994 | |
| DE | 196 30 813 A1 | 3/1997 | |
| DE | 199 11 811 C1 | 6/2000 | |
| GB | 2227431 | * 8/1991 | .................. 296/215 |
| JP | 32521 | * 2/1984 | .................. 296/211 |

OTHER PUBLICATIONS

3M U.S.: 3M Window Film Products, web site, copyright 1995–2004, pp. 1–3.*
Madico Window Films, web site, Apr. 1999, pp. 1–4.*

* cited by examiner

*Primary Examiner*—Dennis H. Pedder
(74) *Attorney, Agent, or Firm*—Nixon Peabody LLP; David S. Safran

(57) ABSTRACT

A glass cover (10) for closing the opening of a motor vehicle roof, with a pane (14) of safety glass which is at least partially transparent has an at least partially transparent shatterproofing film (30) attached to the bottom of the pane or to the bottom of a solar cell composite (60, 62) which is located on the bottom of the pane, and the shatterproofing film having a defined surface structure which is not flat.

40 Claims, 2 Drawing Sheets

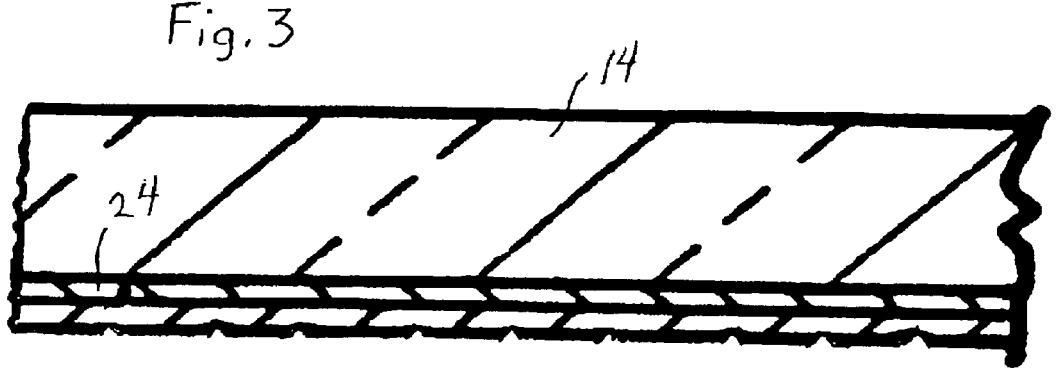
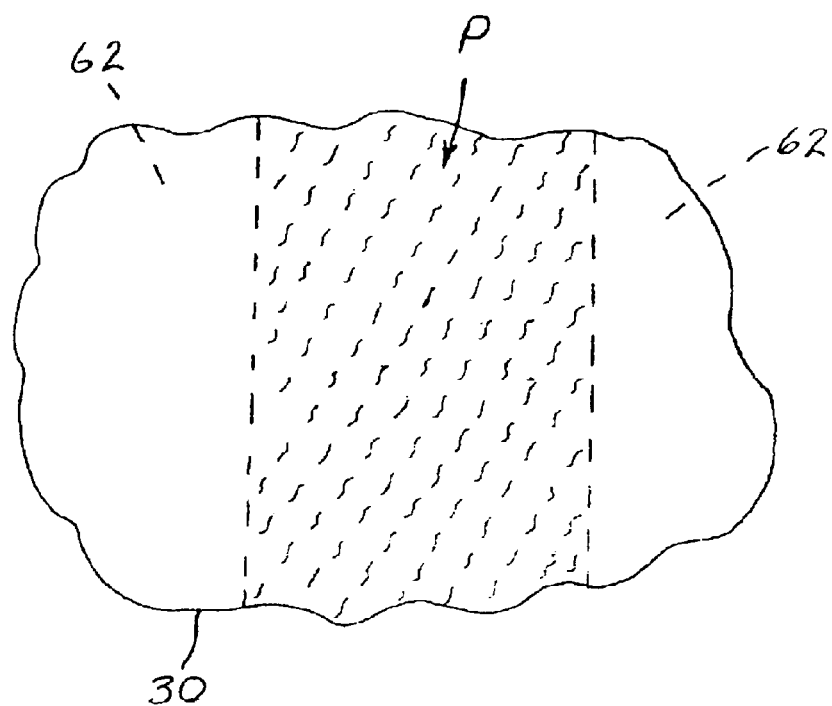

GLASS COVER WITH SHATTERPROOFING FILM

BACKGROUND OF THE INVENTION

1. Field of the Invention

This invention relates to a glass cover for closing the opening of a motor vehicle roof, and which comprises a pane of safety glass which is at least partially transparent.

2. Description of Related Art

A glass cover of the initially mentioned type is known, for example, from published German Patent Application DE 196 30 813 A1, in which an arched pane of single pane safety glass is provided with an electrochrome element on its bottom. The electrochrome element is protected towards the vehicle interior by means of a plastic pane which is attached to the glass pane by means of a layer of the electrochrome element which acts as a cement.

Furthermore, glass covers are known to the bottom of which a solar cell composite laminated and over which a cover film is provided.

SUMMARY OF THE INVENTION

A primary object of the present invention is to devise a glass cover for a motor vehicle roof, with or without a solar function, which offers protection that is as good as possible for the passengers and the vehicle interior when the glass cover breaks and still offers an aesthetically pleasing view from the vehicle interior.

This object is achieved by glass covers in accordance with the invention which, in spite of being provided a shatterproofing film which protects the passengers against slivers when the pane breaks, a pleasing appearance of the glass cover with respect to the motor vehicle interior is ensured. This is important insofar as the shatterproofing film is laminated on the underside, i.e., in the viewing area, and marks can arise which can disrupt the aesthetic appearance; in this connection, smaller film faults which may be present also become immediately conspicuous. Also, when using a composite of at least partially transparent solar cells, the aesthetic appearance with respect to the vehicle interior is also determined by the quality of the film or lamination.

Providing the film with a defined surface structure which is not flat is advantageous insofar as a defined surface structure disrupts the optical appearance aesthetically less than individual undefined marks. The specific printing in component areas is especially advantageous for glass covers with a partially transparent solar cell composite; then, the printing takes place, for example, in areas in which there are solar cell connectors in order to conceal the solar cell connectors with respect to the vehicle interior.

Dyeing of the film makes it possible to reduce light transmission through the film and thus to improve the optical appearance with respect to the motor vehicle interior in the case of using a solar cell composite.

The invention is explained in detail below by way of example using the attached drawings.

BRIEF DESCRIPTION OF THE DRAWINGS

FIG. 2 shows a view like FIG. 1, but an alternative embodiment being shown while FIGS. 3 & 4 show different manners in which the surface of the shatterproofing film may be given a defined texture, the former being scarred by impressions and the latter being imprinted with a printed pattern.

DETAILED DESCRIPTION OF THE INVENTION

Figure 1:
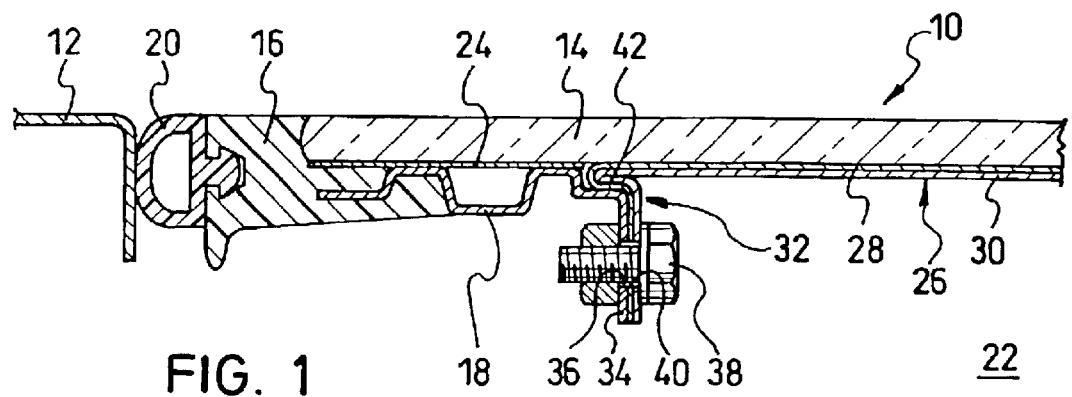
FIG. 1 shows a section through the side edge area of a glass cover in accordance with the invention according to the first embodiment.

FIG. 1 shows a first embodiment of a glass cover 10 which is designed for closing or partially clearing the opening in a fixed roof skin 12. It can be, for example, the cover of a sliding roof, sliding and lifting roof, raising roof, or spoiler roof. The glass cover 10 comprises a transparent glass pane 14 the edge area of which is provided with peripheral foam 16 (for example, polyurethane foam) in order to attach an inside cover sheet 18 to its bottom in the edge area of the pane 14. The inside cover sheet 18 is used as a carrier arrangement for the glass pane 14 to connect the latter to an displacement mechanism (not shown) for the cover 10. On the outside periphery of the peripheral foam 16, there is a seal 20 to prevent the penetration of moisture into the motor vehicle interior 22 when the cover 10 closed. Furthermore, on the bottom of the edge area of the pane 14, in the area of the peripheral foam 16 or of the inside cover sheet 18, there is a glass filter 24 which is used as a substantially opaque vision protection in order to conceal the peripheral foam 16 and the inside cover sheet 18 from overhead.

The glass pane 14 is preferably made of thermally tempered, single pane safety glass. In its central transparent area, a film composite 26 is laminated or cemented to the bottom of the pane 14, this central area extending as far as the filter 24. The film composite 26 is provided on its top, i.e., on the side facing the pane 14, with an adhesive film or adhesive layer 28 which is used to cement the underlying protective film 30 to the pane 14. The protective film 30 is made tear-proof and scratch-resistant. In the edge area shown schematically with reference number 32, the film composite 26 is turned up to the inside such that the adhesive film 28 comes to rest on itself before the film composite 26 is attached to the central area of the pane 14 by means of the adhesive film 28 in the remaining area of the film composite 26. In this state, the film composite 26 is smaller with respect to its base area than the glass pane 14, but larger than its central transparent area. After the cementing or lamination process, the turned-up area 32 can be detached from the bottom of the glass pane 14 and folded down, see FIG. 2.

Then, the inside cover sheet 18 is foamed to the glass pane 14 by means of peripheral foaming 16. The inside cover sheet 18 is provided with an attachment part 34 which projects down with a hole 36, to which the turned-up area 32 of the film composite 26 is attached by means of a screw connection 38 which is guided through a corresponding opening 40 in the turned-up area 32 of the film composite 26 and through the hole 36.

The turned-up area 32 forms with the cemented area of the film composite 26 a tension relief fold 42 which is used to prevent the adhesive connection of the film composite 26 in the central area of the glass pane 14 from being tension-loaded by the attachment of the turned-up area 32 to the inside cover sheet 18, if the cover 10, for example, is elastically deformed by the forces which occur during high speed driving. In this way, the service life of the cover 10 can be prolonged.

Instead of a screw connection 38, the turned-up area 32 can also be attached in a different mechanical manner, for example, by means of a clamp connection, to the inside cover sheet 18.

The described construction is used to ensure that, even when the glass pane 14 breaks, a certain mechanical integrity of the cover 10 is preserved by the film composite 26, even with the pane 14 broken in its edge area, i.e., in the turned-up area 32, remaining stretched out with the cover frame which has been formed by the peripheral foam 16 and the inside cover sheet 18 and which is also preserved with the glass pane 14 broken. In doing so, the film composite 26 does lose its bending stiffness, but remains in place in the cover 10 and thus can prevent, on the one hand, passengers from being ejected to the outside through the broken pane 14, and on the other hand, slivers of the pane 14 or articles from the outside from being able to penetrate into the interior 22. Furthermore, the film composite provides for a certain protection against burglary in the case of intentional destruction of the glass pane 14. The shards of the broken glass pane remain suspended as a result of the adhesive layer 28 on the film composite 26.

The protective film 30 can be made such that it has a defined surface structure which is not flat. This can be achieved, on the one hand, by a correspondingly pretreated film being used, or by a die with a corresponding surface structure being used in the step in which the protective film 30 is laminated onto the bottom of the pane, this structure being impressed during lamination onto the film 30. Preferably a "scarred" structure is used, as is used, for example, also in dashboard surfaces. "Scarred surface structures" are also defined as surface structures which are provided with a regular pattern of impressions as represented in partial section in FIG. 3.

Alternatively, tho protective film 30 can also be provided with an imprinted regular pattern P as shown in FIG. 4.

The adhesive film is preferably a poly(vinylbutyral) film (PVB film) or a transparent PU film, while the protective film 30 is preferably a plastic film which has been scratch-proof coated, preferably a poly(ethyleneterephthalate) film (PET film) coated with polysiloxane.

Figure 2:
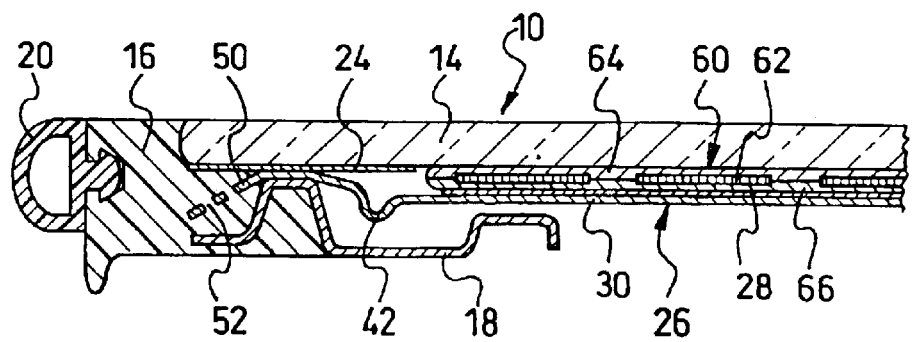

FIG. 2 shows an embodiment in which the cover is made as a so-called solar cover, the bottom of the glass pane 14 being provided with a solar cell film composite 60 which has a plurality of solar cells 62 which are electrically connected to one another and which are located between two hot-melt adhesive films 64 and 66, preferably of EVA. The solar cell film composite 60 is attached to the bottom of the glass pane 14 by means of the upper hot-melt adhesive film 64. The protective film composite 26 is attached to the solar cell film composite 60 and thus to the glass pane 14 by means of the adhesive film 28 on the lower hot-melt adhesive film 66.

In the edge area 50 which is free of adhesive film, the protective film composite 26 is anchored in the peripheral foam 16 by means of perforations 52. In doing so, in the peripheral edge area of the film composite 26, the adhesive film or adhesive layer 28 is removed so that, in this strip-shaped edge area 50 which is free of the adhesive film, there is only the protective film 30. The film composite 26 is cut out overall with a smaller base area than the glass pane 14; however, the central transparent area of the glass pane 14 which lies inside with respect to the glass filter 24 being smaller than the cut-out film composite 26, so that at least the edge area 50 of the film composite 26 which is free of adhesive film is covered by the filter 24 from above.

The edge area 50 which is free of adhesive film is provided with perforations or openings 52 which are distributed essentially regularly over the edge area 50.

First, the film composite 26 in the central area of the glass pane 14 is cemented to the bottom of the pane by means of the adhesive layer 28. The edge area 50 which is free of the adhesive film does not join to the glass pane 14. Then, the glass pane 14 which has been cemented to the film composite 26 in this way is peripherally foamed in a conventional foaming tool with a suitable material, preferably polyurethane, in order to attach the inside cover sheet 18 to the glass pane 14, the foaming material travelling through the perforations 52. In this way the protective film 30 can be anchored in the peripheral foam 16.

In doing so, the anchoring of the protective film 30 corresponds to the mechanical attachment of the turned-up area 32 of the film composite 26 in the embodiment as shown in FIG. 1, between the area anchored in the peripheral foam 16 and the area of the protective film composite 26 cemented to the solar cell film composite 60, there being a relief fold 42 in order to prevent delamination with the pane 14 as a result of tensile loading of the adhesive connection between the protective film composite 26 and the solar cell film composite 60 which could occur as a result of anchoring the area 50 of the protective film composite 26 in the peripheral foam 16.

When the glass pane 14 breaks, the protective film composite 26 anchored in the peripheral foam 16 prevents the shards of the pane and the solar cell film composite 60 from falling in or out and thus protects especially the vehicle interior and the passengers.

In a modified embodiment, the lower hot-melt adhesive film 66 of the solar cell film composite 60 can be omitted so that the adhesive film 28 of the protective film composite 26 is cemented directly to the solar cells 62 or the upper hot-melt adhesive film 64 of the solar cell film composite 60.

The protective film composite 26 can also be fixed differently than as shown in FIG. 8, for example, by means of the process of the embodiment as shown in FIG. 1.

The protective film 30 can be dyed, for example, in bulk, i.e., over its entire thickness, in order to reduce light transmission. Alternatively or in addition, the protective film 30 can be printed in partial areas in order to cover certain sections of the solar cell film composite 60; see, printing P in FIG. 4. It is especially feasible to cover the solar cell connectors between the individual solar cells 62 (the solar cell connectors are not shown in FIG. 2) by means of cover strips which have been pressed onto the protective film 30.

By means of the described optical measures with respect to the protective film 30, overall, a more homogeneous appearance of the glass cover 10 with respect to the vehicle interior 22 can be achieved, and especially disruptive areas of a solar cell composite which may be present can be covered and film faults or marks caused during lamination can be concealed.

What is claimed is:

1. Glass cover for closing the opening of a motor vehicle roof, comprising a pane of safety glass which is at least partially transparent, an at least partially transparent shatterproofing film laminated on the bottom of the pane, the shatterproofing film having a defined textured surface structure, wherein an edge area of the pane has a carrier arrangement attached to the bottom of the pane, and wherein the shatterproofing film has a central area laminated to a central area of the pane and has a peripheral area mechanically affixed to the carrier arrangement.

2. Glass cover in accordance with claim 1, wherein a solar cell composite is located on the bottom of the pane between a portion of the shatterproofing film and the pane.

3. Glass cover in accordance with claim 1, wherein the defined textured surface structure of the shatterproofing film is a surface-structured die imprint.

4. Glass cover in accordance with claim 1, wherein the defined textured surface structure of shatterproofing film is a scarred surface structure.

5. Glass cover in accordance with claim 2, wherein solar cells of the solar cell composite are partially transparent.

6. Glass cover in accordance with claim 1, wherein the attachment of the carrier arrangement to the bottom of the pane is by a peripheral foam, and wherein the shatterproofing film is cemented to the bottom of the pane by an adhesive film.

7. Glass cover in accordance with claim 6, wherein an edge area of the shatterproofing film is permanently connected to the carrier arrangement.

8. Glass cover in accordance with claim 1, wherein the shatterproofing film is laminated on with an adhesive film.

9. Glass cover for closing the opening of a motor vehicle roof, comprising a pane of safety glass which is at least partially transparent, an at least partially transparent shatterproofing film laminated on the bottom of the pane, the shatterproofing film having a partially printed surface; wherein an edge area of the pane has a carrier arrangement attached to the bottom of the pane, and
  wherein the shatterproofing film has a central area laminated to a central area of the pane and has a peripheral area mechanically affixed to the carrier arrangement.

10. Glass cover in accordance with claim 9, wherein a solar cell composite is located on the bottom of the pane between a portion of the shatterproofing film and the pane.

11. Glass cover in accordance with claim 10, wherein the pane is printed in an area of solar cell connectors in the solar cell composite.

12. Glass cover in accordance with claim 10, wherein solar cells of the solar cell composite are partially transparent.

13. Glass cover in accordance with claim 9, wherein the attachment of the carrier arrangement to the bottom of the pane is by a peripheral foam, and wherein the shatterproofing film is cemented to the bottom of the pane by an adhesive film.

14. Glass cover in accordance with claim 13, wherein an edge area of the shatterproofing film is permanently connected to the carrier arrangement.

15. Glass cover in accordance with claim 9, wherein the shatterproofing film is laminated on with an adhesive film.

16. Glass cover for closing the opening of a motor vehicle roof, comprising a pane of safety glass which is at least partially transparent, an at least partially transparent shatterproofing film laminated on the bottom of the pane, the shatterproofing film having been dyed to reduce light transmission through the shatterproofing film;
  wherein an edge area of the pane has a carrier arrangement attached to the bottom of the pane, and
  wherein the shatterproofing film has a central area laminated to a central area of the pane and has a peripheral area mechanically affixed to the carrier arrangement.

17. Glass cover in accordance with claim 16, wherein a solar cell composite is located on the bottom of the pane between a portion of the shatterproofing film and the pane.

18. Glass cover in accordance with claim 17, wherein solar cells of the solar cell composite are partially transparent, and wherein the film has printed cover ships in an area of nontransparent components of the solar cell composite.

19. Glass cover in accordance with claim 16, wherein the attachment of the carrier arrangement to the bottom of the pane is by a peripheral foam, and wherein the shatterproofing film is cemented to the bottom of the pane by an adhesive film.

20. Glass cover in accordance with claim 19, wherein an edge area of the shatterproofing film is permanently connected to the carrier arrangement.

21. Glass cover in accordance with claim 16, wherein the shatterproofing film is laminated on with an adhesive film.

22. Glass cover for closing the opening of a motor vehicle roof, comprising a pane of safety glass which is at least partially transparent, an at least partially transparent shatterproofing film laminated on the bottom of the pane, the shatterproofing film having a defined textured surface structure,
  wherein an edge area of the pane has a carrier arrangement attached to the bottom of the pane by a peripheral foam, and
  wherein the shatterproofing film has a central area adhesively laminated to a central area of the pane and has a peripheral area having a plurality of apertures therein and containing the peripheral foam to anchor the peripheral area of the shatterproofing film to the edge area of the pane.

23. Glass cover in accordance with claim 22, wherein a solar cell composite is located on the bottom of the pane between a portion of the shatterproofing film and the pane.

24. Glass cover in accordance with claim 22, wherein the defined textured surface structure of the shatterproofing film is a surface-structured die imprint.

25. Glass cover in accordance with claim 22, wherein the defined textured surface structure of shatterproofing film is a scarred surface structure.

26. Glass cover in accordance with claim 23, wherein solar cells of the solar cell composite are partially transparent.

27. Glass cover for closing the opening of a motor vehicle roof, comprising a pane of safety glass which is at least partially transparent, an at least partially transparent shatterproofing film laminated on the bottom of the pane, the shatterproofing film having a partially printed surface;
  wherein an edge area of the pane has a carrier arrangement attached to the bottom of the pane by a peripheral foam, and
  wherein the shatterproofing film has a central area adhesively laminated to a central area of the pane and has a peripheral area having a plurality of apertures therein and containing the peripheral foam to anchor the peripheral area of the shatterproofing film to the edge area of the pane.

28. Glass cover in accordance with claim 27, wherein a solar cell composite is located on the bottom of the pane between a portion of the shatterproofing film and the pane.

29. Glass cover in accordance with claim 28, wherein the pane is printed in an area of solar cell connectors in the solar cell composite.

30. Glass cover in accordance with claim 28, wherein solar cells of the solar cell composite are partially transparent.

31. Glass cover in accordance with claim 28, wherein an edge area of the shatterproofing film is embedded in the peripheral foam.

32. Glass cover in accordance with claim 31, wherein an unsecured relief fold is provided between the embedded edge area of the shatterproofing film and the adhesively laminated central area in order to prevent tensile loading which could cause delamination of the shatterproofing film.

33. Glass cover for closing the opening of a motor vehicle roof, comprising a pane of safety glass which is at least partially transparent, an at least partially transparent shatterproofing film laminated on the bottom of the pane, the shatterproofing film having been dyed to reduce light transmission through the shatterproofing film;

wherein edge area of the pane has a carrier arrangement attached to the bottom of the pane by a peripheral foam, and wherein the shatterproofing film has a central area adhesively laminated to a central area of the pane and has a peripheral area having a plurality of apertures therein and containing the peripheral foam to anchor the peripheral area of the shatterproofing film to the edge area of the pane.

34. Glass cover in accordance with claim 33, wherein a solar cell composite is located on the bottom of the pane between a portion of the shatterproofing film and the pane.

35. Glass cover in accordance with claim 33, wherein solar cells of the solar cell composite are partially transparent, and wherein the film has printed cover strips in an area of nontransparent components of the solar cell composite.

36. Glass cover in accordance with claim 35, wherein an edge area of the shatterproofing film is embedded in the peripheral foam.

37. Glass cover in accordance with claim 36, wherein an unsecured relief fold is provided between the embedded edge area of the shatterproofing film and the adhesively laminated central area in order to prevent tensile loading which could cause delamination of the shatterproofing film.

38. Glass cover in accordance with claim 1, wherein an unsecured relief fold is provided between the mechanically affixed peripheral area of the shatterproofing film and the adhesively laminated central area in order to prevent tensile loading which could cause delamination of the shatterproofing film.

39. Glass cover in accordance with claim 9, wherein an unsecured relief fold is provided between the mechanically affixed peripheral area of the shatterproofing film and the adhesively laminated central area in order to prevent tensile loading which could cause delamination of the shatterproofing film.

40. Glass cover in accordance with claim 16, wherein an unsecured relief fold is provided between the mechanically affixed peripheral area of the shatterproofing film and the adhesively laminated central area in order to prevent tensile loading which could cause delamination of the shatterproofing film.

* * * * *